US012654524B2

(12) United States Patent　　(10) Patent No.:　US 12,654,524 B2
Notoya　　(45) Date of Patent:　Jun. 16, 2026

(54) VEHICLE DOOR AND MANUFACTURING METHOD OF VEHICLE DOOR

(71) Applicant: YACHIYO INDUSTRY CO., LTD., Sayama (JP)

(72) Inventor: Sho Notoya, Saitama (JP)

(73) Assignee: YACHIYO INDUSTRY CO., LTD., Sayama (JP)

( * ) Notice: Subject to any disclaimer, the term of this patent is extended or adjusted under 35 U.S.C. 154(b) by 0 days.

(21) Appl. No.: 18/873,195

(22) PCT Filed: Apr. 19, 2023

(86) PCT No.: PCT/JP2023/015659
§ 371 (c)(1),
(2) Date: Dec. 9, 2024

(87) PCT Pub. No.: WO2023/238522
PCT Pub. Date: Dec. 14, 2023

(65) Prior Publication Data
US 2025/0368015 A1　Dec. 4, 2025

(30) Foreign Application Priority Data
Jun. 9, 2022　(JP) ................................. 2022-093665

(51) Int. Cl.
*B60J 5/10*　(2006.01)
*B32B 3/30*　(2006.01)
(Continued)

(52) U.S. Cl.
CPC ................. *B60J 5/107* (2013.01); *B32B 3/30* (2013.01); *B32B 7/12* (2013.01); *B32B 27/08* (2013.01); *B32B 2605/00* (2013.01)

(58) Field of Classification Search
CPC ... B60J 5/107; B32B 3/30; B32B 7/12; B32B 27/08; B32B 2605/00
See application file for complete search history.

(56) References Cited

U.S. PATENT DOCUMENTS

| 10,960,934 B2 * | 3/2021 | Shantz | ................... B62D 29/04 |
| 2005/0202223 A1 * | 9/2005 | Harima | .................. B60J 5/0405 |
| | | | 428/292.1 |

(Continued)

FOREIGN PATENT DOCUMENTS

| EP | 2653331 B1 | 10/2013 |
| JP | 2006151194 A | 6/2006 |

(Continued)

OTHER PUBLICATIONS

International Search Report (w/ English translation) for corresponding PCT Application No. PCT/JP2023/015659, mailed Jun. 27, 2023, 5 pages.

(Continued)

*Primary Examiner* — Gregory J Strimbu
(74) *Attorney, Agent, or Firm* — Dority & Manning, P.A.

(57) ABSTRACT

A door for a vehicle comprises an outer panel and an inner panel joined to the outer panel by an adhesive. An outer surface of the inner panel includes an outer surface main part crossing a bonding direction of the inner panel and the outer panel at a first crossing angle, and an outer surface inclined part connected to the outer surface main part via a corner portion so as to form a ridge line and crossing the bonding direction at a second crossing angle smaller than the first crossing angle. A part of the corner portion having the adhesive deposited thereon is provided with a recess and a pair of first ribs are formed in a part of the outer surface main part adjacent to the corner portion in a mutually spaced apart relationship on either side of the recess, the first ribs being inclined such that a spacing between the first ribs becomes smaller toward the corner portion.

6 Claims, 6 Drawing Sheets

Figure 1:
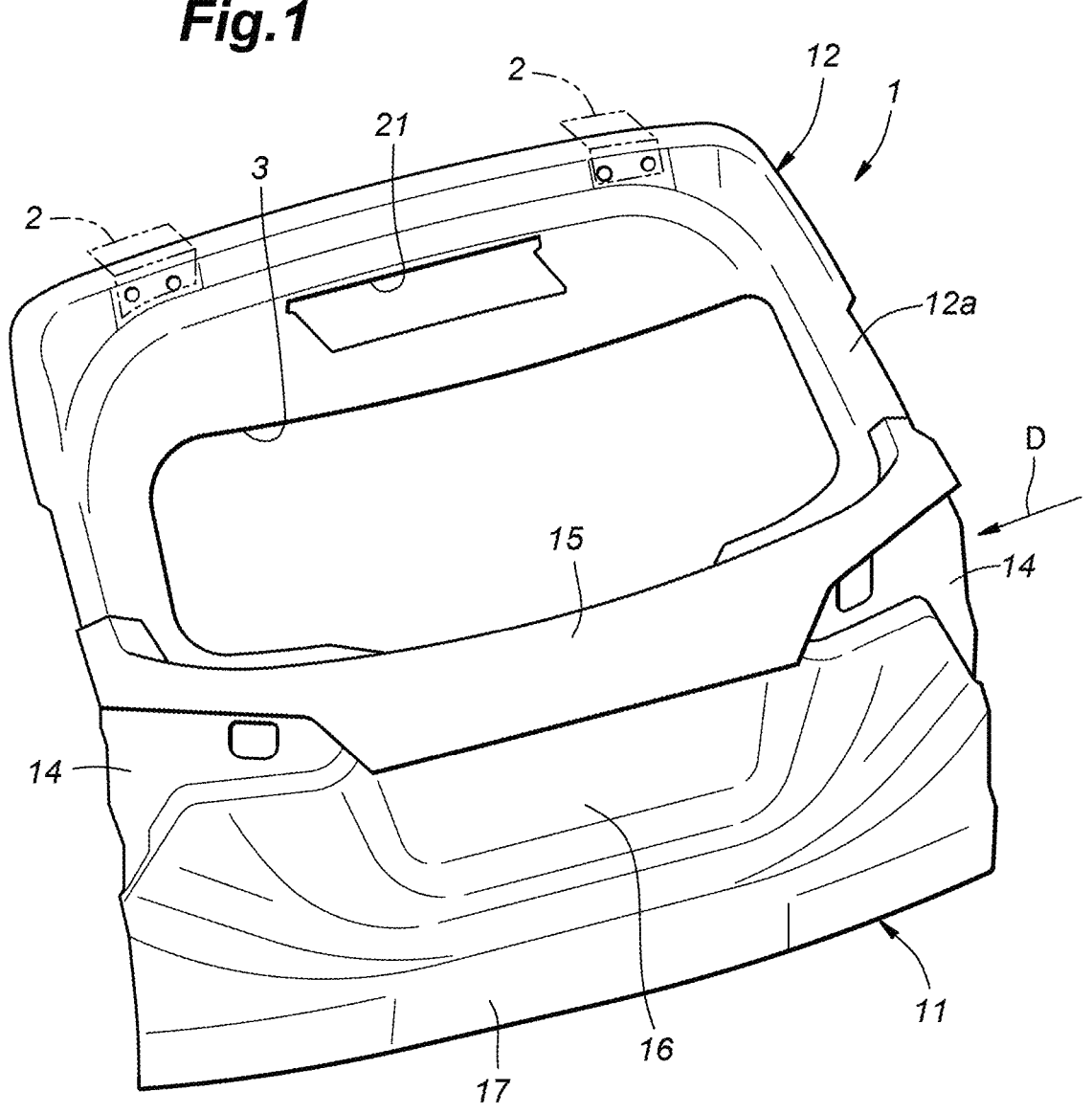

(51) Int. Cl.
   B32B 7/12        (2006.01)
   B32B 27/08       (2006.01)

(56)                References Cited

U.S. PATENT DOCUMENTS

| | | | |
|---|---|---|---|
| 2015/0210147 A1* | 7/2015 | Kodama | B60J 5/10 |
| | | | 296/146.6 |
| 2016/0375747 A1* | 12/2016 | Kawashima | B60J 5/101 |
| | | | 49/475.1 |
| 2018/0056763 A1* | 3/2018 | Motohashi | B60J 5/107 |
| 2019/0135093 A1* | 5/2019 | Adachi | B60J 5/101 |
| 2020/0147899 A1 | 5/2020 | Royston | |
| 2023/0339299 A1* | 10/2023 | Matsushita | B60J 5/101 |

FOREIGN PATENT DOCUMENTS

| | | | |
|---|---|---|---|
| JP | 2014233984 A | | 12/2014 |
| JP | 2016078566 A | | 5/2016 |
| JP | 2017-210089 | * | 11/2017 |
| WO | WO 2024/005127 | * | 1/2024 |

OTHER PUBLICATIONS

Written Opinion of the International Searching Authority for corresponding PCT Application No. PCT/JP2023/015659, dated Jun. 27, 2023, 3 pages.

* cited by examiner

*Fig.2*

Fig.5

VEHICLE DOOR AND MANUFACTURING METHOD OF VEHICLE DOOR

CROSS-REFERENCE TO RELATED APPLICATIONS

This application is the U.S. National Stage entry of International Application No. PCT/JP2023/015659, filed on Apr. 19, 2023, which, in turn, claims priority to Japanese Patent Application No. 2022-093665, filed on Jun. 9, 2022, both of which are hereby incorporated herein by reference in their entireties for all purposes.

TECHNICAL FIELD

The present invention relates to a vehicle door and a manufacturing method of a vehicle door.

BACKGROUND ART

A vehicle door is known in the art that includes an outer panel and an inner panel made of plastic material and placed on the inside of the outer panel, and has a structure in which the inner panel and the outer panel are joined to each other with an adhesive (Patent Document 1). In this door structure, the joint portion between the inner panel and the outer panel includes a bent portion which is bent from the panel surface in a crank shape and includes a bottom panel portion and a wall portion. Due to the presence of the bent portion, when placing the outer panel onto the inner panel, the adhesive deposited on a part of the bottom panel portion of the inner panel remote from a concave part (corner part) defined between the bottom panel portion and the wall portion is scraped away by a convex part (corner part) formed in the outer panel. Since the adhesive is required to function as a sealant as well, if the adhesive is scraped away by the corner portion, a sealing failure may occur. According to this prior art, to avoid a sealing failure, a rib is provided in a convex part of the inner panel so as to extend across the wall portion and the bottom panel portion thereof in such a manner that the rib bites into the adhesive.

PRIOR ART DOCUMENT(S)

Patent Document(s)

Patent Document 1: JP5867258B

SUMMARY OF THE INVENTION

Task to be Accomplished by the Invention

However, in the vehicle door disclosed in Patent Document 1, the rib bites into the adhesive at a laterally central part of the adhesive. As a result, the thickness of the adhesive where the rib bites into, including the corners, is smaller than in other parts. If a correct amount of adhesive is applied and the adhesive is deposited on parts of the inner panel and the outer panel other than the rib over a predetermined width, a required sealing performance may be achieved. However, the adhesive may drip in a lateral direction due to gravity with the result that the width of the adhesive adhering to both the inner panel and the outer panel may become insufficient. As described above, conventional vehicle doors have room for improvement in terms of ensuring sealing performance.

In view of the above background, it is an object of the present invention to ensure a required sealing performance of a vehicle door even when a convex part is provided on the bonding surface between an inner panel and an outer panel.

Means to Accomplish the Task

To accomplish such a task, an aspect of the present invention provides a door (1) for a vehicle, comprising: an outer panel (11) positioned on an exterior of the vehicle; and an inner panel (12) positioned on an interior of the vehicle and joined to the outer panel (11) by an adhesive (13), wherein an outer surface (12a) of the inner panel includes an outer surface main part (31) crossing a bonding direction (D) of the inner panel and the outer panel at a first crossing angle (θ1), and an outer surface inclined part (32) connected to the outer surface main part (31) via a corner portion (34) so as to form a ridge line and crossing the bonding direction at a second crossing angle (θ2) smaller than the first crossing angle, wherein an inner surface (11a) of the outer panel includes an inner surface main part (36) that opposes the outer surface main part, and an inner surface inclined part (36) that opposes the outer surface inclined part, and wherein a part of the corner portion having a part of the adhesive deposited thereon is provided with a recess (40), and a pair of first ribs (41) is formed in a part of the outer surface main part adjacent to the corner portion in a mutually spaced apart relationship on either side of the recess, the first ribs being inclined such that a spacing between the first ribs becomes smaller toward the corner portion.

According to this aspect, since the recess is formed in the corner portion, an adequate thickness of the adhesive is ensured in the corner portion. When the inner panel and the outer panel are moved toward each other in the bonding direction, the adhesive adheres to the outer panel and is pulled by the outer panel in the bonding direction. According to this aspect, since the adhesive applied to the outer surface main part is collected in the recess by the first ribs, an adequate thickness of the adhesive in the corner portions is ensured.

In this aspect of the present invention, preferably, a pair of second ribs (42) is formed in a part of the outer surface inclined part adjacent to the corner portion in a mutually spaced apart relationship on either side of the recess.

According to this aspect, the adhesive applied to the outer surface inclined part is suppressed from sagging to one side in the lateral direction due to gravity. As a result, the adhesive is filled between the two second ribs so that an adequate sealing performance of the adhesive at the outer surface inclined part is ensured.

In this aspect of the present invention, preferably, the second ribs extend parallel to each other along the bonding direction.

According to this aspect, when the inner panel and the outer panel are moved toward each other in the bonding direction, the adhesive is prevented from flowing in any direction other than the bonding direction so that the adhesive does not fail to fill the space between the two second ribs.

In this aspect of the present invention, preferably, a spacing between ends of the first ribs adjacent to the corner portion and a spacing between the second ribs are equal to each other.

According to this aspect, the excess of the adhesive collected in the recess by the first ribs is collected between the second ribs on the outer surface inclined part. This ensures a required sealing performance of the adhesive in the outer surface inclined part.

In this aspect of the present invention, preferably, the first ribs are in contact with the inner surface main part, and the second ribs are in contact with the inner surface inclined part.

According to this aspect, the adhesive is prevented from flowing out from between the two first ribs and between the two second ribs until the uncured adhesive is hardened. Thereby, the sealing performance of the part where the first ribs and the second ribs are provided can be ensured.

To accomplish such a task, another aspect of the present invention provides a method of manufacturing a door of a vehicle as defined above, comprising the steps of: applying the adhesive to the outer surface of the inner panel; placing the outer panel at a position corresponding to the outer surface of the inner panel; and moving the inner panel and the outer panel in the bonding direction toward each other to adhere the adhesive to the inner surface of the outer panel.

According to this aspect, when the inner panel and the outer panel are relatively moved in the bonding direction toward each other, the adhesive adheres to the outer panel and is pulled by the outer panel in the bonding direction. At this time, since the adhesive applied to the outer surface main part is collected in the recess by the two first ribs, an adequate thickness of the adhesive in the corner portions is ensured.

Effect of the Invention

According to these configurations, a required sealing performance of a vehicle door can be ensured even when a convex part is provided on the bonding surface between an inner panel and an outer panel.

BRIEF DESCRIPTION OF THE DRAWING(S)

Figure 3:
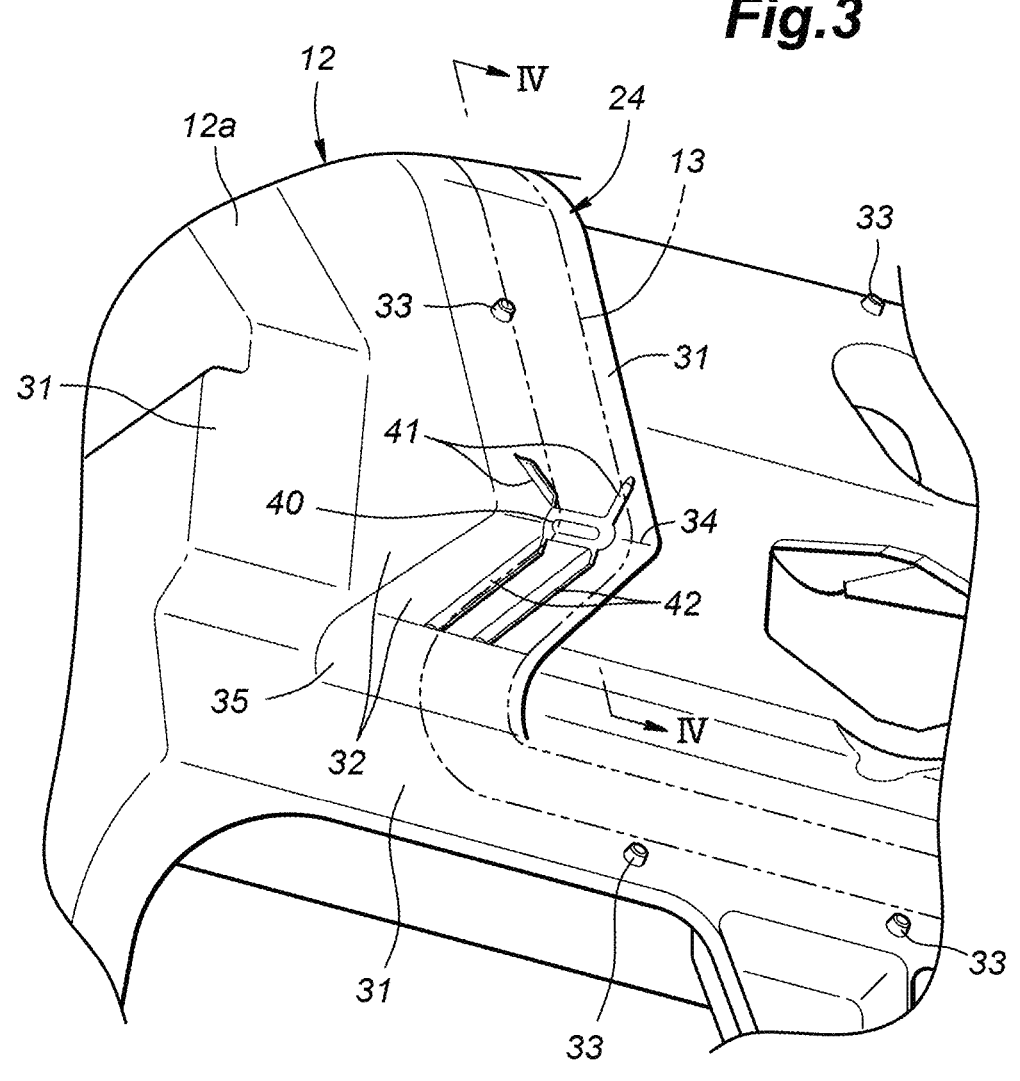
Figure 4:
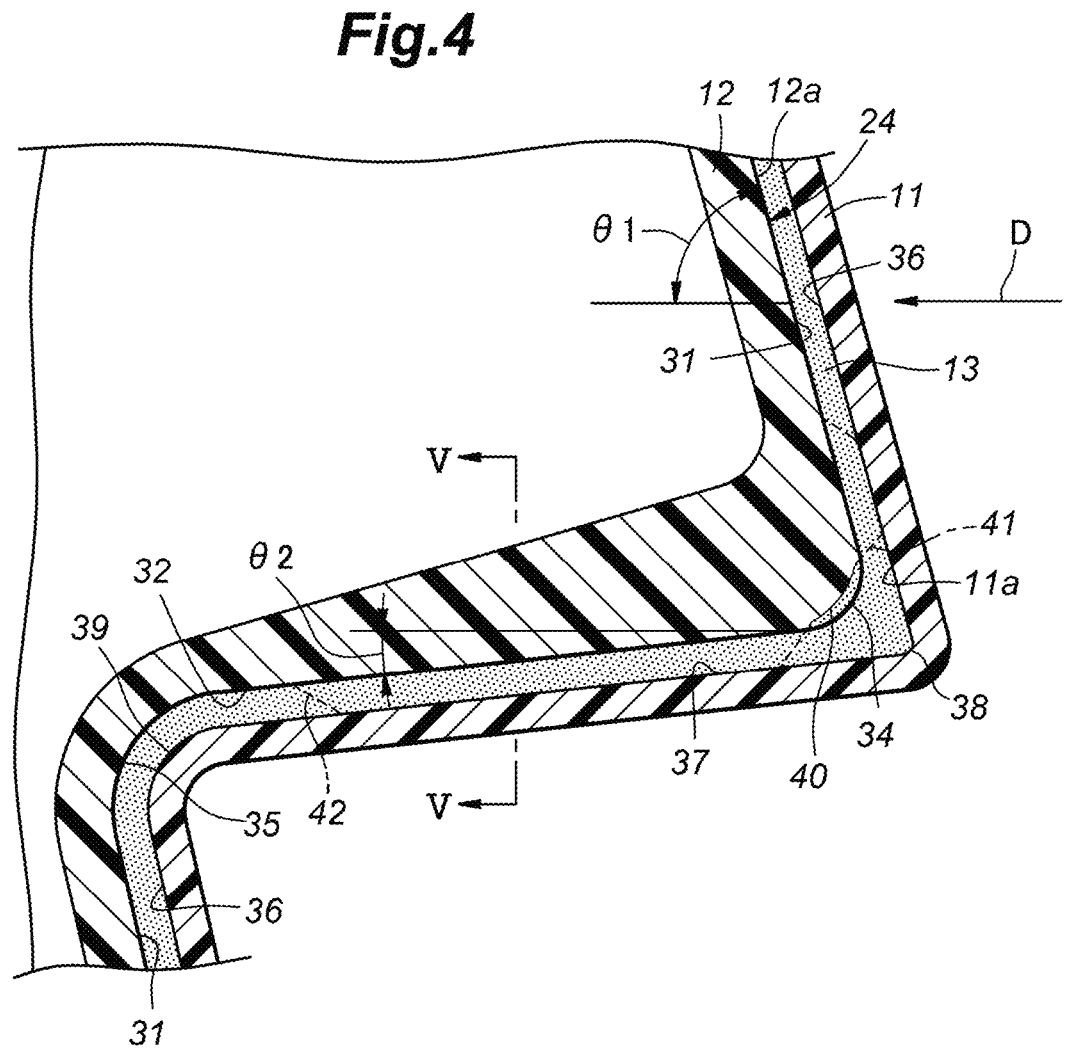
Figure 6A:
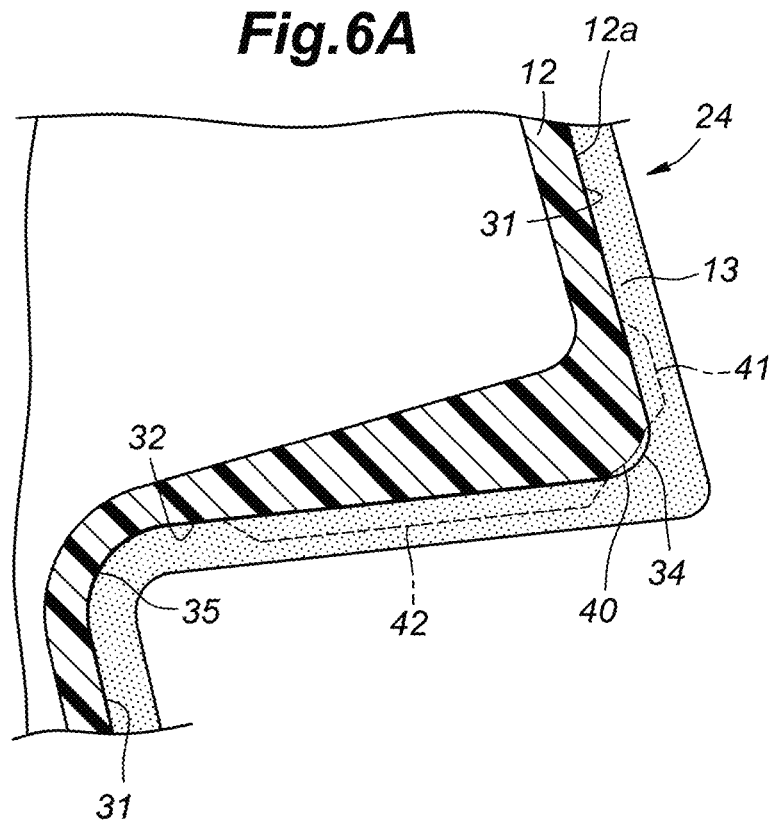
Figure 6B:
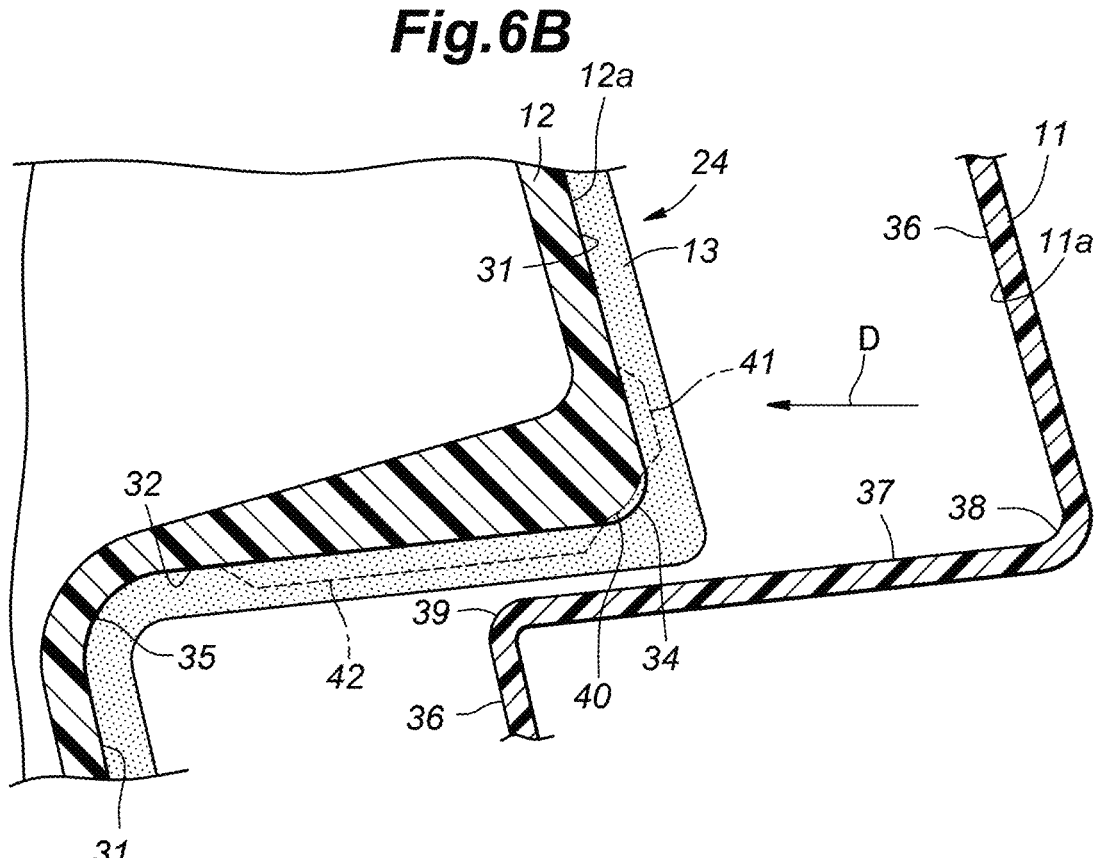

FIG. 1 a perspective view of a tailgate according to an embodiment of the present invention;

Figure 2:
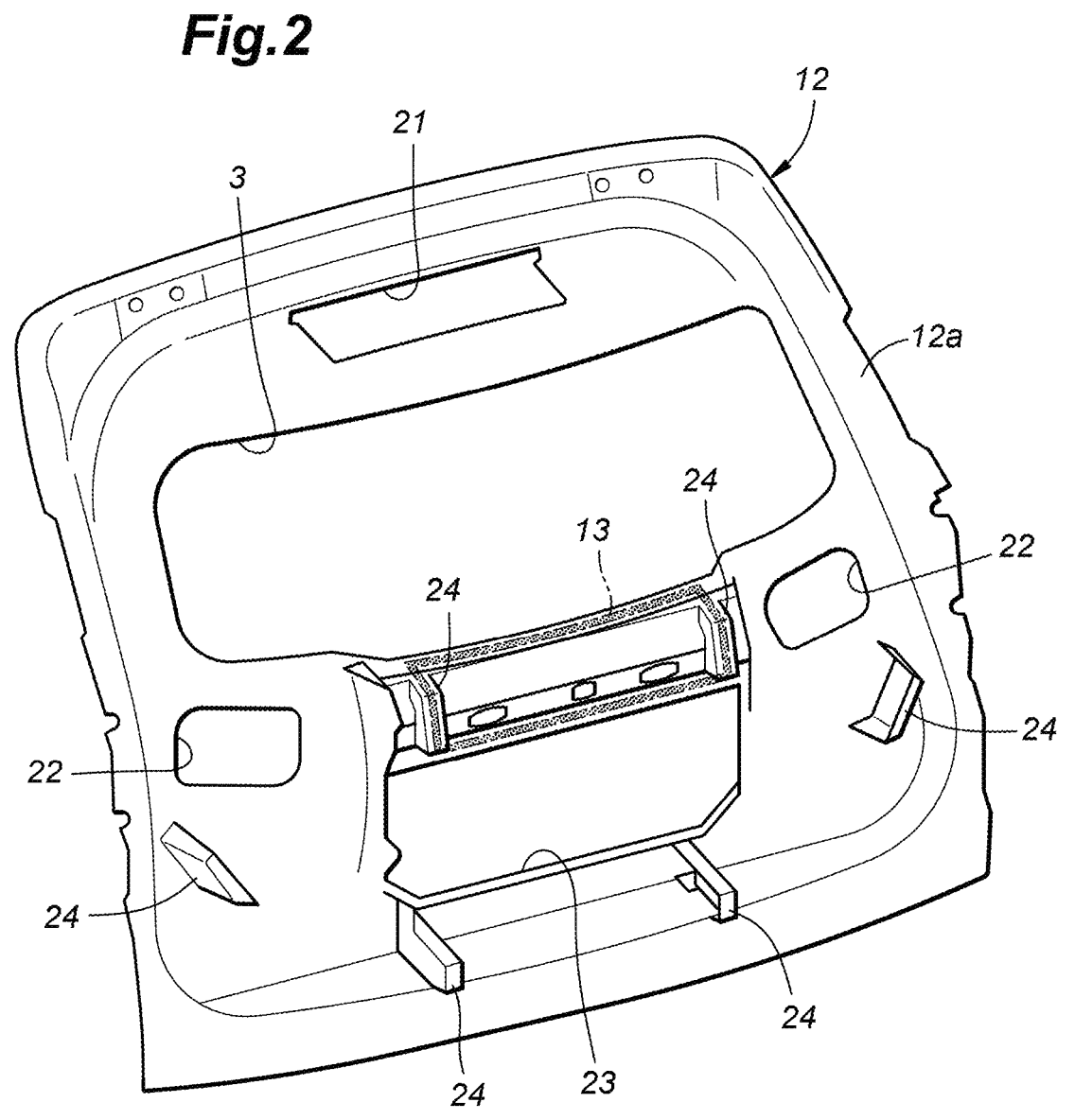

FIG. 2 a perspective view of an inner panel;

FIG. 3 a perspective view of an essential part of the inner panel including a supporting projection as seen from below;

FIG. 4 a sectional view taken along line IV-IV in FIG. 3;

Figure 5:
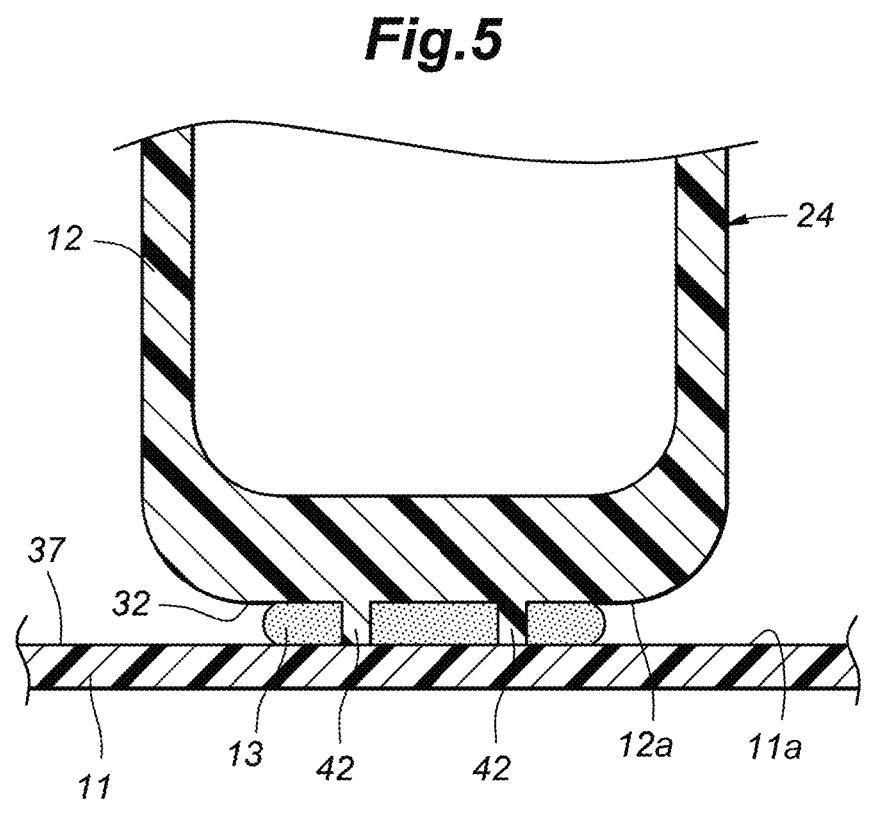

FIG. 5 a sectional view taken along line V-V in FIG. 4;

FIG. 6A an explanatory view illustrating a bonding operation of a manufacturing process of the tailgate of the present embodiment;

FIG. 6B an explanatory view illustrating an outer panel placing operation of the manufacturing process of the tailgate of the present embodiment.

DESCRIPTION OF THE PREFERRED EMBODIMENT(S)

An embodiment of the present invention will be described in the following in detail with reference to the drawings. In this embodiment, the vehicle door according to the present invention is applied to a tailgate 1 of a vehicle.

FIG. 1 is a perspective view of a tailgate 1 according to an embodiment of the present invention. As shown in FIG. 1, the tailgate 1 is fitted to a vehicle body by a pair of hinges 2 attached to the upper part thereof so as to be rotatable around an axis extending laterally. A rear window opening 3 is formed in an upper part of the tailgate 1. The rear window opening 3 is closed by a rear window panel made of a transparent or translucent plate member made of glass, plastic, or the like.

The tailgate 1 is a hollow structure formed by joining together an outer panel 11 positioned on the exterior of the vehicle and an inner panel 12 positioned on the interior of the vehicle. In the illustrated embodiment, the outer panel 11 is composed of a plurality of members divided into upper and lower parts, and only the members located in a lower part of the tailgate 1 are shown in the drawings. Alternatively, the outer panel 11 may consist of a one-piece member.

The outer panel 11 and the inner panel 12 of this embodiment are each made of plastic material. Here, "made of plastic material" means that it is made of a material containing plastic material, and may also contain materials other than plastic material. The outer panel 11 and the inner panel 12 are injection molded plastic members which are bonded to each other at the outer periphery or the like by using an adhesive 13 (see FIGS. 4 and 5). More specifically, with the adhesive 13 applied to the outer surface 12a of the inner panel 12, the outer panel 11 is moved in the bonding direction D indicated by the arrow in FIG. 1 until the adhesive 13 adheres to the inner surface 11a of the outer panel 11. By curing the adhesive 13 in this state, the outer panel 11 and the inner panel 12 are joined to each other. Note that the bonding direction D is a direction of the relative movement when the inner panel 12 and the outer panel 11 are joined to each other, and is not limited to the direction of movement of the outer panel 11 itself.

The mode of joining the outer panel 11 with the inner panel 12 is not limited to the foregoing, and may additionally include friction bonding, ultrasonic bonding, laser and other welding methods, hot melt, and mechanical fastening, in addition to the use of the adhesive 13. The tailgate 1 can be made light-weight owing to the use of the plastic material for the outer panel 11 and the inner panel 12, as compared to the case where these panel members are formed by stamped steel sheet.

A pair of mounting recesses 14 are formed on either side of the outer panel 11 for mounting rear combination lamps therein. A housing protrusion 15 is formed in a part of the outer panel 11 located under the rear window opening 3. The housing protrusion 15 has a laterally elongated bulging shape, and accommodates a tailgate handle lever and a license plate illumination lamp. The housing protrusion 15 is elongated along the width of the vehicle. A plate mounting portion 16 is formed at a lower part of a laterally central part of the housing protrusion 15 for mounting a license plate as a recessed part which is recessed relative to the housing protrusion 15 and the left and right side parts. A bumper face 17 is formed under the plate mounting portion 16.

FIG. 2 is a perspective view of the inner panel 12. As shown in FIG. 2, a first opening 21 is formed in the upper part of the inner panel 12 for mounting a stop lamp. A second opening 22 is formed on each side of a vertically central part of the inner panel 12 for mounting a rear combination lamp. A third opening 23 is formed in a laterally central part of the inner panel 12 located under the second openings 22. These openings are each closed by a lid member fitted from the side of the passenger compartment.

A plurality of support protrusions 24 protrude rearward from appropriate positions of the outer surface 12a of the inner panel 12 to support the outer panel 11 from inside. The support protrusions 24 include a pair of support protrusions 24 that are formed between the second openings 22 laterally spaced apart from each other and so as to correspond to the housing protrusion 15. The support protrusions 24 support the housing protrusion 15 of the outer panel 11 from inside.

The tailgate handle lever and the license plate illumination lamp are housed inside the housing protrusion 15 of the outer panel 11 as described above, and water splashed up during driving could infiltrate into the interior of the housing protrusion 15. Therefore, the internal space defined between the housing protrusion 15 of the outer panel 11 and the inner panel 12 is sealed by the adhesive 13 applied in an annular shape.

FIG. 3 is a perspective view of a main part of the inner panel 12, including one of the support protrusions 24, viewed from below. As shown in FIGS. 2 and 3, the adhesive 13 includes a part that vertically extends across the support protrusion 24. The adhesive 13 extends across the tip end surface (rearward facing surface) and the downward facing surface of the support protrusion 24, bends inward under the support protrusion 24, and extends laterally on the outer surface 12*a* of the inner panel 12.

The part of the outer surface 12*a* of the inner panel 12 on which the adhesive 13 extends laterally may be considered as a main surface facing generally rearward, or a surface of a part of the outer panel 11 facing the outer panel 11 when the outer panel 11 is bonded (substantially opposite to the bonding direction D indicated in FIG. 1). Hereinafter, the part of the outer surface 12*a* of the inner panel 12 facing generally rearward will be referred to as an outer surface main part 31.

Here, "facing generally rearward" and "facing generally in a direction opposite to the bonding direction D" mean that the surface extends along a plane crossing the bonding direction D at an angle greater than a predetermined angle (for example, 20°) (see FIGS. 1 and 4). The predetermined angle means an angle at which there is no risk that the adhesive 13 attached to the outer panel 11 will be pulled and torn off as the outer panel 11 moves away from the inner panel 12 when the outer panel 11 is bonded. The predetermined angle has a value that is determined depending on the type of the adhesive 13, the moving distance of the outer panel 11 from the position where the adhesive 13 adheres to the outer panel 11 to the bonding completion position, and the like. The predetermined angle may be, for example, 5° to 30°, or 10° to 20°.

The surface that crosses the bonding direction D at an angle equal to or less than the predetermined angle is a surface where the applied adhesive 13 is likely to be pulled and torn off when the outer panel 11 is bonded. Hereinafter, such a surface will be referred to as an outer surface inclined part 32. The angle of the outer surface inclined part 32 with respect to the bonding direction D is smaller than the angle of the outer surface main part 31 with respect to the bonding direction D.

A plurality of protrusions 33 having a predetermined height and serving as spacers are formed near the parts of the outer surface main part 31 to which the adhesive 13 is applied. The protrusions 33 ensure the thickness of the adhesive 13 by abutting against the inner surface 11*a* of the outer panel 11 when the outer panel 11 is bonded.

FIG. 4 is a sectional view taken along line IV-IV in FIG. 3. As shown in FIGS. 3 and 4, each support protrusion 24 defines a part of the outer surface 12*a* of the inner panel 12, and has an outer surface main part 31 located at a tip end and an outer surface inclined part 32 continuously connected to the lower edge of the outer surface main part 31. The outer surface inclined part 32 is continuously connected to the outer surface main part 31 via a ridgeline-shaped convex corner portion 34 extending in the lateral direction. The front edge of the outer surface inclined part 32 is continuously connected to an outer surface main part 31 located under the support protrusion 24 via a valley-like concave corner portion 35 extending in the lateral direction.

The outer surface main part 31 of the support protrusion 24 generally faces rearward as described above, and crosses the bonding direction D at a first crossing angle θ1. The first crossing angle θ1 is larger than the predetermined angle. The outer surface inclined part 32 faces generally downward and crosses the bonding direction D at a second crossing angle θ2 smaller than the first crossing angle θ1. The second crossing angle θ2 is equal to or less than the predetermined angle.

As shown in FIG. 4, each of the parts of the outer panel 11 that is bonded to the corresponding part of the inner panel 12 by the adhesive 13 is conformal to the corresponding part of the inner panel 12. Thus, the inner surface 11*a* of the outer panel 11 is provided with inner surface main parts 36 that oppose the corresponding outer surface main parts 31 via the adhesive 13, and the inner surface inclined parts 37 that oppose the corresponding outer surface inclined parts 32 via the adhesive 13. The rear edge (upper edge) of the inner surface inclined part 37 is continuously connected to the outer surface main part 31 via a valley-like concave corner portion 38 extending in the lateral direction. The front edge (lower edge) of the inner surface inclined part 37 is continuous with the outer surface main part 31 via a ridgeline-shaped convex corner portion 39 extending in the lateral direction.

As shown in FIG. 3, a recess 40 is formed in the convex corner portion 34 of each support protrusion 24. The recess 40 is provided at the center of the convex corner portion 34 in the extending direction (lateral direction), and in a part where the adhesive 13 is applied. The recess 40 has a predetermined length in the extending direction of the convex corner portion 34 (lateral direction). The predetermined length is a value set as the width of the adhesive 13 (width of the seal) to be attached to the outer panel 11 and the inner panel 12.

A pair of first ribs 41 protrude from a part of the outer surface main part 31 of the support protrusion 24 adjacent to the convex corner portion 34. The first ribs 41 have a length smaller than the height (vertical dimension) of the outer surface main part 31 of the support protrusion 24, and are formed only in the vicinity of the convex corner portion 34. The height (projecting dimension) of the first ribs 41 is approximately the same or more preferably the same as the height of the protrusions 33. The first ribs 41 substantially contacts the outer panel 11 in the bonded state. "Substantially" means that a film-like adhesive 13 may be present or intervene. The first ribs 41 extend on either side of the recess 40 laterally spaced apart from each other, and are inclined so that the distance between them narrows as they approach the convex corner portion 34. The spacing between the ends of the first ribs 41 on the side of the convex corner portion 34 matches the length of the recess 40 in the lateral direction.

A pair of second ribs 42 protrude from the outer surface inclined part 32 of the support protrusion 24. The second ribs 42 have a length slightly smaller than the longitudinal dimension of the outer surface inclined part 32 and extend from the convex corner portion 34 to the vicinity of the concave corner portion 35. The height (projecting dimension) of the second ribs 42 is approximately the same or more preferably the same as the height of the first ribs 41. The second ribs 42 are substantially in contact with the outer panel 11 in the bonded state. The second ribs 42 extend along the bonding direction D on either side of the recess 40 laterally spaced apart from each other in parallel to each other. The distance between the two second ribs 42 matches the dimension of the recess 40 in the lateral direction. Thus, the distance between the two second ribs 42 is equal to the distance between the ends of the two first ribs 41 on side of the convex corner portion 34.

FIG. 5 is a sectional view taken along line VV in FIG. 4. As shown in FIG. 5, the adhesive 13 is filled between the two second ribs 42 to join the outer panel 11 and the inner panel 12 to each other. The adhesive 13 also adheres to the outer panel 11 and the inner panel 12 on the outside of the second ribs 42, and joins them together.

FIGS. 6(A) and 6(B) show is an explanatory diagram of the manufacturing process of the tailgate 1 according to the present embodiment. When joining the outer panel 11 to the inner panel 12, a worker performs the work according to the following procedure. Note that FIGS. 6(A) and 6(B) show the tailgate 1 in the same posture as in FIG. 4, that is, in the closed position where the tailgate 1 attached to the vehicle body closes the tailgate opening. The attitude of the tailgate 1 is not limited to this. For example, the tailgate 1 may be assembled with the outer surface 12*a* (outer surface main part 31) of the inner panel 12 facing upward.

As shown in FIG. 6(A), in the bonding operation, the adhesive 13 is first applied to a predetermined position on the outer surface 12*a* of the inner panel 12. The thickness of the applied adhesive 13 after the bonding is greater than the height of the first ribs 41 and the height of the second ribs 42. Thereafter, as shown in FIG. 6(B), the outer panel 11 is placed at a predetermined position facing the inner panel 12 and moved in the bonding direction D. At this time, the adhesive 13 adheres to the inner surface 11*a* of the outer panel 11. The outer panel 11 is moved to a position where the inner surface 11*a* thereof abuts against the protrusions 33 and the first ribs 41. By curing the adhesive 13 in this state, the outer panel 11 and the inner panel 12 are bonded to each other, and the tailgate 1 gains the configuration shown in FIG. 4.

Hereinafter, the effects of the tailgate 1 according to the embodiment of the present invention will be discussed. As described above, the recess 40 is formed in the part of each convex corner portion 34 where the adhesive 13 is provided. Therefore, the thickness of the adhesive 13 is ensured at the convex corner portion 34. When the outer panel 11 is moved in the bonding direction D toward the inner panel 12, the adhesive 13 adheres to the outer panel 11 and is pulled in the bonding direction D by the outer panel 11. In this embodiment, since the adhesive 13 applied to the outer surface main part 31 is collected in the recess 40 by the first ribs 41, an adequate thickness of the adhesive 13 is ensured in the convex corner portion 34.

As shown in FIG. 3, the second ribs 42 are formed in the vicinity of the convex corner portion 34 of the outer surface inclined part 32 so as to be spaced apart from each other and interpose the recess 40 therebetween. Therefore, the adhesive 13 applied to the outer surface inclined part 32 is prevented from sagging to one side in the lateral direction due to gravity. As a result, the adhesive 13 is filled between the two second ribs 42 so that the sealing performance of the adhesive 13 at the outer surface inclined part 32 is ensured.

As shown in FIGS. 6(A) and 6(B), the two second ribs 42 extend parallel to each other along the bonding direction D. Therefore, when the inner panel 12 and the outer panel 11 are moved toward each other in the bonding direction D, the adhesive 13 is prevented from flowing in directions other than the bonding direction D. Thereby, the adhesive 13 is filled between the two second ribs 42 in a reliable manner.

As shown in FIG. 3, the distance between the ends of the two first ribs 41 on the side of the convex corner portion 34 and the distance between the two second ribs 42 are equal to each other. Therefore, the excess of the adhesive 13 collected in the recess 40 by the first ribs 41 is collected between the second ribs 42 at the outer surface inclined part 32. This ensures the sealing performance of the adhesive 13 on the outer surface inclined part 32.

As shown in FIG. 4, the two first ribs 41 are in contact with the inner surface main part 36, and the two second ribs 42 are in contact with the inner surface inclined part 37. Therefore, the adhesive 13 is prevented from flowing out from between the two first ribs 41 and between the two second ribs 42 until the uncured adhesive 13 hardens. Thereby, the sealing performance of the region where the first ribs 41 and the second ribs 42 are provided is ensured.

Further, the method for manufacturing the tailgate 1 according to the embodiment of the present invention provides the following effects by executing the following steps. More specifically, as shown in FIG. 6(A), a step of applying adhesive 13 to the outer surface 12*a* of the inner panel 12 is performed. Further, a step of placing the outer panel 11 at a position corresponding to the outer surface 12*a* of the inner panel 12 is performed. Thereafter, a step is performed in which the inner panel 12 and the outer panel 11 are moved toward each other in the bonding direction D until the adhesive 13 is attached to the inner surface 11*a* of the outer panel 11. The adhesive 13 attached to the outer panel 11 is pulled in the bonding direction D by the outer panel 11. At this time, since the adhesive 13 applied to the outer surface main part 31 is collected in the recess 40 by the first ribs 41, an adequate thickness of the adhesive 13 is ensured at the convex corner portion 34.

The present invention has been described in terms of a specific embodiment, but is not limited to the embodiment described above and can be variously modified in implementation. For example, in the embodiment described above, the present invention was applied to the tailgate 1 of a vehicle, but the present invention may also be applied to vehicle doors such as a driver's seat door, a passenger's seat door, and a rear seat door. Further, both the outer panel 11 and the inner panel 12 were made of plastic material in the tailgate 1 of the foregoing embodiment, but one or both may be made of sheet steel. In this case, the ribs of the inner panel 12 may be formed, for example, by stamp forming. In addition, the specific configuration, arrangement, quantity, material, assembly procedure, etc. of each member or part can be changed as appropriate without departing from the scope of the present invention. On the other hand, all of the constituent elements shown in the above embodiment are not necessarily essential and can be selected as appropriate.

LIST OF REFERENCE NUMERALS

| | |
|---|---|
| 1: tailgate (vehicle door) | 2: hinge |
| 3: rear window opening | 11: outer panel |
| 11a: inner surface | 12: inner panel |
| 12a: outer surface | 13: adhesive |
| 14: mounting recess | 15: receiving protrusion |
| 16: plate mounting portion | 17: bumper face |
| 21: first opening | 22: second opening |
| 23: third opening | 24: support protrusion |
| 31: outer surface main part | 32: outer surface inclined part |
| 34: convex corner portion | D: bonding direction |
| θ1: first crossing angle | θ2: second crossing angle |

The invention claimed is:

1. A door for a vehicle, comprising: an outer panel positioned on an exterior of the vehicle; and an inner panel positioned on an interior of the vehicle and joined to the outer panel by an adhesive, wherein an outer surface of the inner panel includes an outer surface main part crossing a bonding direction of the inner panel and the outer panel at a first crossing angle, and an outer surface inclined part connected to the outer surface main part via a corner portion so as to form a ridge line and crossing the bonding direction at a second crossing angle smaller than the first crossing angle, wherein an inner surface of the outer panel includes an inner surface main part that opposes the outer surface main part, and an inner surface inclined part that opposes the outer surface inclined part, and wherein a part of the corner portion having a part of the adhesive deposited thereon is provided with a recess, and a pair of first ribs are formed in a part of the outer surface main part adjacent to the corner portion in a mutually spaced apart relationship on either side of the recess, the first ribs being inclined such that a spacing between the first ribs becomes smaller toward the corner portion.

2. The door for the vehicle according to claim 1, wherein a pair of second ribs are formed in a part of the outer surface inclined part adjacent to the corner portion in a mutually spaced apart relationship on either side of the recess.

3. The door for the vehicle according to claim 2, wherein the second ribs extend parallel to each other.

4. The door for the vehicle according to claim 3, wherein a spacing between ends of the first ribs adjacent to the corner portion and a spacing between the second ribs are equal to each other.

5. The door for the vehicle according to claim 2, wherein the first ribs are in contact with the inner surface main part, and the second ribs are in contact with the inner surface inclined part.

6. A method of manufacturing the door for the vehicle according to claim 1, comprising the steps of:

applying the adhesive to the outer surface of the inner panel;

placing the outer panel in a position corresponding to the outer surface of the inner panel; and moving the inner panel and the outer panel in the bonding direction toward each other to adhere the adhesive to the inner surface of the outer panel.

* * * * *